UNITED STATES PATENT OFFICE.

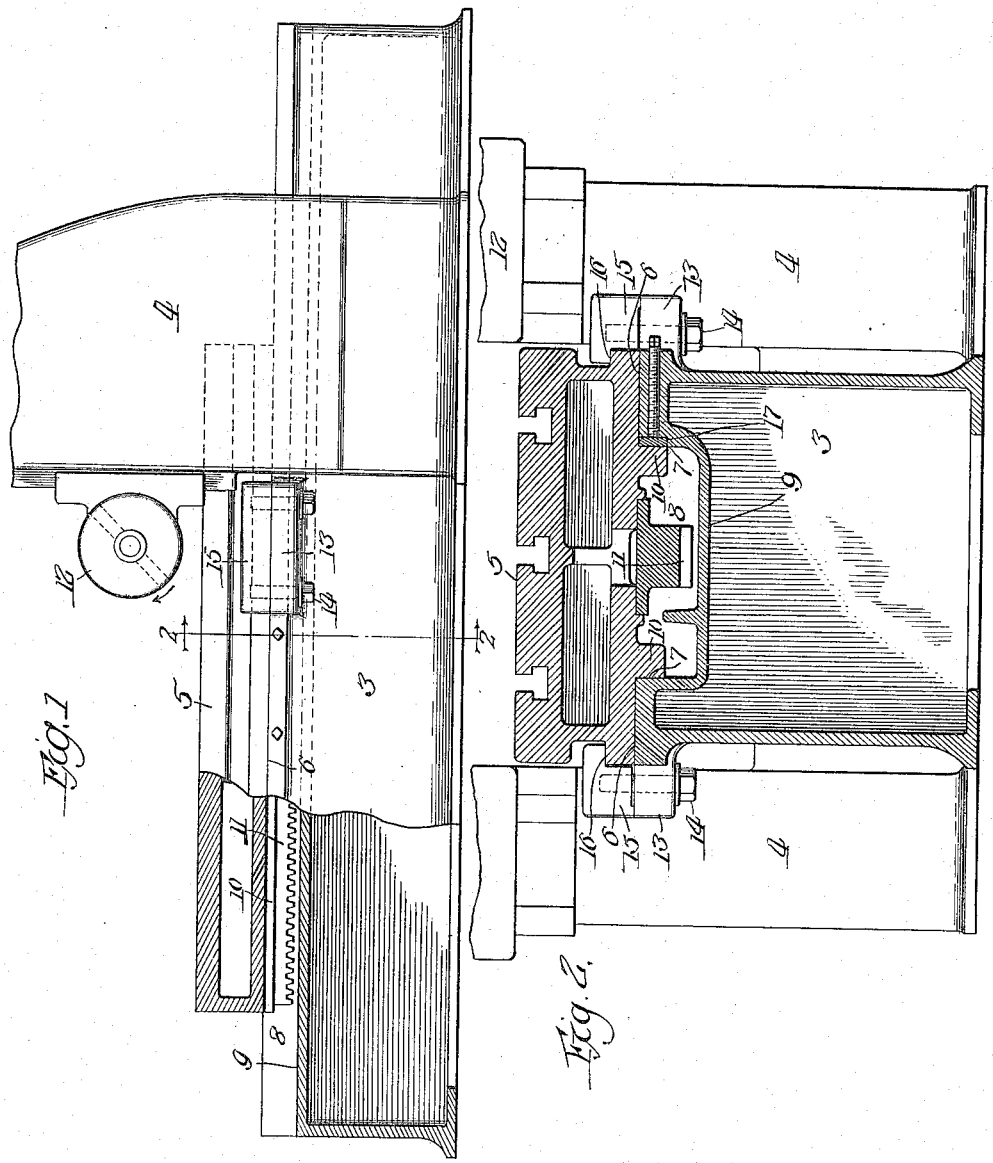

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

MILLING-MACHINE.

1,143,584.   Specification of Letters Patent.   Patented June 15, 1915.

Application filed September 9, 1913. Serial No. 788,799.

*To all whom it may concern:*

Be it known that I, JOHN R. JOHNSON, a citizen of the United States, residing at Rockford, in the county of Winnebago and State of Illinois, have invented certain new and useful Improvements in Milling-Machines, of which the following is a specification.

This invention relates to planing machines of the milling type, in which a work-carrying table is mounted to reciprocate horizontally upon a bed, and in which the cutting tool or tools are carried by side housings to operate on work mounted on the top of the table.

It has been a practice, heretofore, to mount a table to slide upon longitudinal ways on a bed and provide overhanging guides at the sides of the table for engaging ways on the bed to hold the table from being raised from the bed. By this means of mounting the table the over-all width of the horizontal ways is necessarily less than the width of the working face of the table. Moreover, with a given distance between the side housings, the width of the horizontal ways is limited to less than that of the working face of the table, by reason of the said side guides being interposed between the outer edges of the horizontal bar and the inner sides of the housings.

One of the objects of my invention is to provide in a planing machine of the milling type, means for mounting the table wherein there will be no side guides at the outer sides of the horizontal bearing face intermediate the side housings. I also aim to provide guide means for holding the table from being raised from the bed, of such construction as to permit the distance between the outer edge of the horizontal ways to be the same as that between the outer edges of the working face of the table.

In machines wherein it is desired to have as wide a table as is permissible between the side housings I aim to provide horizontal bearing faces or ways of such construction as to preclude mounting or carrying said guides intermediate the side housings for holding the table from being raised from the bed.

Another object of my invention is to provide means for holding the table from being raised from the bed, whereby the frictional resistance between the bed and table will be reduced to a minimum, and whereby the table may be more efficiently and effectively operated. With these considerations in view I provide relatively short-length clamping members or guides positioned at one side of the bed, preferably carried by the bed, and located at one side of the side housings beneath the tool-carrying means at the face thereof, for holding the table from being raised from the bed. This clamping or guiding means is in engagement with only so much of the table as is actually located or is passing directly below the cutting tools thereby directly counteracting the raising force applied to the table by said tools, without engaging the entire length of the table.

In the accompanying drawings: Figure 1, is a side elevation view of a milling machine embodying my invention. Fig. 2, is a vertical transverse section taken on the line 2—2 of Fig. 1.

A longitudinal table carrying bed 3 is disposed at right angles intermediate side housings or columns 4 which extend above the bed to provide means for carrying tool holders and spindles. On the top of the bed is formed longitudinal slideways or bearing faces upon which a work carrying table or carriage 5 is mounted. The horizontal bearing faces 6 are disposed at the extreme outer top portions of the bed within close proximity to the side housings 4 and extend inward from said housings terminating within the bed top at vertical guide faces 7, thus leaving a longitudinal opening 8 which is spanned by an underhung top 9. The work carrying table 5 mounted slidable longitudinally upon bearing faces 6, is held from lateral displacement by the depending side guides 10, which bear against guide faces 7, and has secured to its underside a longitudinal rack 11 disposed in opening 8, which rack may be suitably driven by well known expedients to reciprocate the table longitudinally upon the bed.

At the operating or working side of each of the housings 2, is mounted a spindle head 12, or tool carriers of suitable form may be carried at this side. The spindle heads are mounted to slide vertically on the side housings as is well understood in machines of this character, whereby the cutting tools may be vertically adjusted with respect to the table. Carried by the bed, disposed below the spindle head and extending outward from the sides of the bed are guide supports 13, to which guides or clamping members 15 are adjustably secured by bolts 14. The members 15 have guide faces 16 in contact with guide faces at the outer side of the table parallel with bearing faces 6, the members 15 serving to maintain the table operable upon the bed against any raising forces applied to the table. It is obvious that by tightening the bolts 14 the guide faces 16 of the guides or clamping members 15 may be drawn downwardly either to take up for wear or to clamp the table fixedly with the bed and thereby hold the table from being moved lengthwise. The table is held in this manner when it is desired that the work be stationary and the spindle heads 12 carrying cutters (not shown) be moved with respect thereto to perform the cutting operation. An adjustable gib plate 17 is interposed between a side guide of the table and the bed to take up lateral play.

The structure of table mounting above disclosed allows a maximum amount of horizontal bearing face to be obtained between two side housings, this being evidenced by the fact that the said bearing faces may extend to within such close proximity to said housings as to allow only clearance space for the lengthwise travel of the table. This is further enabled by the clamping members or guides 15 being carried rigidly by the base and not being carried by the table at the outer side thereof where they would displace room which is here utilized for bearing face.

It is apparent that by mounting the table on the bed in the above manner the distance between the outer edges of the horizontal ways is substantially equal to that between the outer edges of the working face of the table. By such construction the cutters may be positioned to operate upon work in proximity to the sides of the table and the work will be carried rigidly and stable and the cutters will not be caused to chatter as is often the case with bed constructions in which the distance between the outer edges of the horizontal ways is less than that between the outer edges of the working face of the table.

It will be noted that in planing machines of the milling type a lifting force is applied to the table by the action of the cutter or cutters, according to the nature of their cutting, and to obtain effective cutting the table must be properly supported to withstand the laterally applied lifting forces.

When the machine is in cutting operation, with work mounted upon the table and a cutting tool in the spindle 12 operating upon the work rotatable in the direction indicated by the arrow in Fig. 1, the tendency is to raise the table from the bed and this force is counteracted by guide members 15 engaging the table and bed directly below the spindle. In the common construction of gibs carried by the table extending throughout the length of the same, it will be noticed that their usefulness is approximately negligible except as to the portions thereof passing directly under the spindle and counteracting said lifting force. In my improved construction it will be seen that the clamping members or guides are disposed stationary directly under the spindle to directly counteract said force thus reducing materially the amount of holding bearing face to only that which is functionally employed at all times during cutting operation. Furthermore, by so disposing the clamping members and by the use of the maximum over-all width of bearing face between the housings a greater lifting leverage may be applied at the side portions of the table, which feature is very essential to heavy working and cutting, for without it the machine would be inefficient in its operation and cutting.

I claim as my invention.

1. The combination with side housings and a bed disposed intermediate the same, of a table slidably mounted upon longitudinal ways on the bed, and of clamping members carried by the sides of the bed at one side of the housings and in coöperation with said table.

2. The combination with a longitudinal bed and side housings disposed at opposite sides thereof, of a table movable longitudinally on the bed, tool holding means carried above said table by the side housings, and a clamping member carried by the bed directly below said tool holding means and in operable engagement with said table.

3. In a machine of the character described, the combination of a bed, side housing, a table slidably mounted on horizontal ways at each side of the bed to move longitudinally thereon between the side housings, guideways intermediate the said horizontal ways for guiding the table from lateral movement, and guide means for holding the table from being raised from the bed, said guide means being stationary so as not to travel with the table in its lengthwise movement.

4. In a machine of the character described, the combination of a bed, side housings at opposite sides thereof, a table slidably mounted on the bed to pass between the side housings, and relatively stationary clamping means located at the outer sides of the bed at one side of the side housings and coöperating with the table to hold the same from being raised from the bed, said clamping means being adjustable to lock the table fixedly in connection with the bed.

5. The combination of a bed, upright side housings at opposite sides thereof, a table slidably mounted on horizontal bearing faces or ways on the bed to move longitudinally thereon between said side housings, and stationary guide means located at the outer sides of the bed at one side of said side housings for holding the table from being raised from the bed, the table being devoid of overhanging side guides adapted to engage the bed, whereby the distance between the outer edges of the horizontal ways is substantially equal to the distance between the outer edges of the working face of the table.

6. The combination of a bed, upright side housings at opposite sides thereof, a table slidably mounted on horizontal ways on the bed to move longitudinally thereon between the side housings, and relatively stationary guide means positioned at the outer sides of the bed and coöperating with the table, said guide means being positioned at one side of the side housings so as to permit the horizontal ways of the bed to extend within close proximity to the inner sides of the side housings.

7. In a machine of the character described, the combination of a bed, side housings, a table slidably mounted on the bed to pass between the side housings, the bearing between the table and bed being of an over-all width such as to preclude positioning table-and-bed guide means intermediate the outer sides of the said bearings and the inner sides of the side housing, and guide means for holding the table from being raised from the bed, said guide means being positioned so as not to engage that portion of the table which is passing between the side housings.

8. In a machine of the character described, the combination of a bed, side housings, a table slidably mounted on the bed to pass between the side housings, the bearing between the table and bed being of an over-all width such as to preclude positioning table-and-bed guide means intermediate the outer sides of the said bearings and the inner sides of the side housing, and guide means carried by the bed at one side of the side housings for holding the table from being raised from the bed.

9. The combination with a bed and side housings at opposite sides of the same, of longitudinal ways on the bed comprising horizontal bearing faces at each side of the bed and a vertically disposed bearing face at the inner edge of each horizontal bearing face, a table slidably mounted on said ways whereby it is held from lateral displacement by the vertically disposed bearing faces, and guides carried by the bed at the outer side thereof for engaging the table and holding the same from being raised from the bed.

10. The combination with a bed and side housings at opposite sides of the same, of longitudinal ways on the bed comprising horizontal bearing faces at each side of the bed and a vertically disposed bearing face at the inner edge of each horizontal bearing face, a table slidably mounted on said ways whereby it is held from lateral displacement by the vertically disposed bearing faces, and guides carried by the bed at the outer sides thereof and at one side only of the side housings for engaging the table and holding the same from being raised from the bed.

11. The combination with a bed, upright side housings at opposite sides thereof, and a table slidably mounted on ways on the bed to move longitudinally thereon between said side housings, guide means intermediate said ways for guiding the table from being laterally displaced, and of guide means carried by and fixedly with the outer sides of the bed at one side only of the said side housings for holding the table from being raised from the bed.

12. In a machine of the character described, the combination of a bed, side housings at the opposite sides of the bed, a table slidably mounted on the bed to move longitudinally thereon between the said side housings, tool-supporting means carried by the side housings at the face thereof and above the table, and guide means for holding the table from being raised from the bed, the guide means comprising adjustable guides carried by the bed directly below the tool-carrying means at said face side only of the side housings and being adjustable to clamp the table with the bed.

13. In a machine of the character described, the combination of a bed, a table slidably mounted on the bed to move longitudinally thereon between the side housings, the table being mounted on horizontal bearing faces at each side of the bed, said bearing faces extending to such close proximity to the side housings as to preclude the positioning of the table side-guides between the outer sides of the said bearing faces and the side housings.

14. In a machine of the character described, the combination of a bed, a work-holding table mounted on the bed to slide longitudinally thereon, tool-holding means located above the bed to operate upon work carried by said table, the ways upon which the table is mounted being so constructed as to guide the table from lateral movement but not as to hold the table from being raised from the bed, and guide means being in engagement with only that portion of the table which is in approximately vertical alinement with the tool-holding means.

15. In a machine of the character described, the combination of a bed, a work-holding table mounted on the bed to slide longitudinally thereon, the ways upon which the table is mounted being so constructed as not to hold the table from being raised from the bed, tool-holding means located above the bed to operate on work carried by the table, and relatively stationary guide means for holding the table from being raised from the bed, said means being operatively engageable with only that portion of the table which lies directly beneath the tool-holding means.

16. In a machine of the character described, the combination of a bed, a table slidably mounted on longitudinal ways in the bed, said ways being arranged to guide the table substantially throughout its full length from being displaced laterally but not from being raised from the bed, and guide means carried by the bed for engaging only a relatively short length of longitudinal ways on the table for holding the table from being raised from the bed.

In testimony whereof I have hereunto set my hand in presence of two subscribing witnesses.

JOHN R. JOHNSON.

Witnesses:
 JOHN F. MCCANNA, Jr.,
 E. D. E. N. BEHEL.

Copies of this patent may be obtained for five cents each, by addressing the "Commissioner of Patents Washington, D. C."